United States Patent
Deckers et al.

(10) Patent No.: US 6,812,274 B2
(45) Date of Patent: Nov. 2, 2004

(54) PIGMENT CONCENTRATES AND THEIR PRODUCTION

(75) Inventors: Andreas Deckers, Flomborn (DE); Wilhelm Weber, Neustadt (DE); Stefan Weiss, Neckargemünd (DE); Naria Edlu Keene von Koenig, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 28 days.

(21) Appl. No.: 10/148,925
(22) PCT Filed: Dec. 6, 2000
(86) PCT No.: PCT/EP00/12277
§ 371 (c)(1),
(2), (4) Date: Jun. 5, 2002
(87) PCT Pub. No.: WO01/44387
PCT Pub. Date: Jun. 21, 2001

(65) Prior Publication Data
US 2003/0019400 A1 Jan. 30, 2003

(30) Foreign Application Priority Data
Dec. 13, 1999 (DE) .......................... 199 60 122

(51) Int. Cl.$^7$ ............................................. C08L 91/06
(52) U.S. Cl. ....................... 524/487; 524/474; 524/490; 585/10; 106/502
(58) Field of Search ................................ 524/487, 490; 525/240; 106/502

(56) References Cited

U.S. PATENT DOCUMENTS

| | | | | |
|---|---|---|---|---|
| 4,230,501 A | * | 10/1980 | Howard et al. | 106/502 |
| 4,759,801 A | * | 7/1988 | Goldmann et al. | 106/502 |
| 4,810,733 A | * | 3/1989 | Sakuma et al. | 523/206 |
| 4,911,830 A | * | 3/1990 | Bromley et al. | 252/301.16 |
| 5,576,260 A | * | 11/1996 | Winter et al. | 502/117 |
| 5,852,143 A | * | 12/1998 | Sishta et al. | 526/127 |
| 5,880,193 A | * | 3/1999 | Berke et al. | 524/385 |
| 6,133,490 A | * | 10/2000 | Toyoda et al. | 585/9 |
| 6,143,846 A | * | 11/2000 | Herrmann et al. | 526/170 |
| 6,316,547 B1 | * | 11/2001 | Varlet | 525/191 |
| 6,384,148 B1 | * | 5/2002 | Herrmann et al. | 525/333.8 |
| 6,407,189 B1 | * | 6/2002 | Herrmann | 526/160 |
| 6,451,102 B1 | * | 9/2002 | Hilder et al. | 106/417 |
| 2002/0151639 A1 | * | 10/2002 | Knebelkamp et al. | 524/487 |
| 2003/0022978 A1 | * | 1/2003 | Hohner et al. | 524/487 |
| 2003/0050381 A1 | * | 3/2003 | Hohner et al. | 524/487 |

FOREIGN PATENT DOCUMENTS

| | | | | |
|---|---|---|---|---|
| EP | 719 802 | | 7/1996 | |
| EP | 890 584 | | 1/1999 | |
| EP | 896 983 | | 2/1999 | |
| EP | 0 896 983 | * | 2/1999 | ........... C08L/25/04 |
| EP | 0 902 045 | * | 3/1999 | ............ C08J/3/22 |
| JP | 50-58144 | * | 5/1975 | ........... C09B/67/00 |
| JP | 11-106573 A | * | 4/1999 | ........... C08L/23/04 |
| WO | WO 99/12997 | | 3/1999 | |
| WO | WO 99/12997 A1 | * | 3/1999 | .............. C08J/3/22 |

OTHER PUBLICATIONS

JP 11–106573 (abstract and English translation).*
11106573 Japan Abstract.

* cited by examiner

*Primary Examiner*—David W. Wu
*Assistant Examiner*—Rip A. Lee
(74) *Attorney, Agent, or Firm*—Keil & Weinkauf

(57) ABSTRACT

Pigment concentrates comprising at least one pigment, a polyethylene wax prepared from one ethylene and, if desired, one comonomer using a metallocene catalyst, if desired a thermoplastic polymer and, if desired, additives can be used to color plastic moldings and plastic sheets.

8 Claims, No Drawings

PIGMENT CONCENTRATES AND THEIR PRODUCTION

The present invention relates to pigment concentrates comprising at least one pigment, a polyethylene wax prepared from ethylene and, if desired, one or more olefins using a metallocene catalyst, if desired a thermoplastic polymer and, if desired, additives.

Numerous pigments are marketed in the form of a pigment concentrate since this makes processing easier when coloring plastics. These formulations generally comprise, in addition to the pigment, a dispersant, for example a wax, and, if desired, a thermoplastic polymer, usually a polyolefin. The thermoplastic polymer is also referred to as a carrier polymer. The wax serves to disperse the pigment finely in the formulation and to stabilize this dispersion. A typical commercial formulation of such a pigment concentrate (masterbatch) comprises 25% by weight of pigment, 10% by weight of wax and 65% by weight of a polyethylene. The wax used is frequently a polyethylene wax which can be obtained, for example, by free-radical polymerization or by Ziegler-Natta catalysis. The polyethylene wax can be modified so as to make it polar, for example by oxidation. The ratios of the individual components can be varied within certain limits.

A critical prerequisite for the usability of such a pigment concentrate is the correct choice of the wax component. Although it is not colored itself, it influences the brilliance of the pigment concentrate. For more detailed information, reference may be made, for example, to the product brochure "Luwaxe®—Anwendung in Pigmentkonzentraten" about polyethylene waxes from BASF AG.

The pigment agglomerates have to be wetted well by the wax to prevent clumping together of the agglomerates. A small number of relatively large pigment agglomerates makes less contribution to the pigmenting power of the pigment concerned than does a larger number of smaller pigment agglomerates.

It is therefore an objective to allow no large pigment agglomerates to be formed during the formulation process. Furthermore, it is desirable to separate any previously formed agglomerated pigments and to split them up into their primary particles. Finally, the primary particles should also remain separated after the formulation process and not reagglomerate during cooling.

To achieve this, the wax has to meet a number of requirements. One of these requirements concerns the viscosity of the melt. The viscosity of the melt should be as low as possible so that the molten wax can readily penetrate the voids within the agglomerates of the pigment during formulation, which is usually carried out by mixing at a temperature above the melting point of the wax. As a result of the shear forces applied in this way, the agglomerates are more readily split up into the primary particles.

The wetting capability of the waxes should also be good.

Polar groups can in principle be introduced into a wax by means of various process steps.

One method is to partially degrade the wax by means of atmospheric oxygen or peroxide compounds. Examples of peroxide compounds which can be used are hydrogen peroxide ($H_2O_2$) and dialkyl peroxides. Partial degradation methods introduce hydroxyl groups and carboxyl groups as polar groups into the macromolecules. These polar groups are distributed nonuniformly over the molecule, as a result of which the wetting capability of the molecule chains of the waxes is not optimum.

Another method is to use polar comonomers such as acrylic acid, methacrylic acid, acrylic esters, methacrylic esters or vinyl acetate, which may be suponified. A disadvantage of this process is that polar comonomers can act as catalyst poisons for Ziegler-Natta catalysts and the catalysts therefore lose activity. A further disadvantage is that the comonomers are not incorporated uniformly into the waxes. Comonomers are usually incorporated preferentially into the short-chain molecules, which leads to undesirably nonuniform properties of the wax.

It has been found that many pigment concentrates have insufficient brilliance for high-quality applications. This problem can be solved only to a limited extent by a larger proportion of pigment. The price of the pigment is the decisive factor for determining the production cost of a pigment concentrate. For this reason, a higher proportion of pigment would-be an economic disadvantage.

Conversely, it can also be desirable to have an equivalent pigment concentrate containing lower proportions of the expensive pigment for less demanding applications.

EP-A 0 890 584 discloses the use of metallocene polypropylene waxes having an isotacticity index greater than 70% for masterbatches. However, a disadvantage of using a metallocene polypropylene wax is that specific racemic isomers of the metallocenes are necessary for preparing isotactic polypropylene. The meso isomer formed in customary syntheses firstly has to be separated off and then has to be either discarded or converted into the desired racemate in a further step.

Finally, it has been found that the brilliance of the masterbatches does not continue to increase significantly at high pigment concentrations, which is attributable to unsatisfactory dispersion. Poorly dispersed agglomerates can be detected, for example, by microscopic examination.

It is an object of the invention
- to provide pigment concentrates which make it possible to color plastic moldings and plastic sheets and which are easy to prepare and have improved brilliance compared to the prior art without the percentage of pigments having to be increased,
- to provide a process for producing these concentrates,
- to produce plastic moldings and plastic sheets which are colored by means of the pigment concentrates of the present invention, and
- to find a process for coloring thermoplastic polymers and moldings by means of the concentrates of present invention.

We have found that this object is achieved by using metallocene polyethylene waxes as dispersants in pigment concentrates. We have found that these give better results than conventional polyethylene waxes.

The present invention provides pigment concentrates (masterbatches) comprising the following components:
- at least one pigment selected from among inorganic or organic pigments.

Examples of inorganic pigments are
- zinc white, zinc sulfide, lithopone, lead white, lead sulfate, chalk, titanium dioxide;
- iron oxide yellow, cadmium yellow, nickel-titanium yellow, chromium titanium yellow, chromium yellow, lead chromate, bismuth vanadate, Naples yellow or zinc yellow;
- ultramarine blue, cobalt blue, manganese blue, iron blue;
- ultramarine green, cobalt green, chromium oxide (chromium oxide green);
- ultramarine violet, cobalt violet, manganese violet;
- ultramarine red, molybdate red, chromium red, cadmium red;

iron oxide brown, chromium-iron brown, zinc-iron brown, manganese titanium brown;

iron oxide black, iron-manganese black, spinel black, carbon black;

orange-colored spinels and aluminas, cadmium orange, chromium orange, lead molybdate;

aluminum or Cu/Zn alloy.

Examples of organic pigments are metal phthalocyanines such as phthalocyanine blue or phthalocyanine green, also perylene red, diaryl yellow, isoindoline yellow, quinophthalone pigments, quinacridone pigments, benzimidazolone pigments, malachite green, thioindigo, monoazo pigments, diazo pigments, coated azo pigments, naphthol AS pigments, benzimidazolone pigments, diketopyrrolopyrroles, indanthrone, azo condensation pigments, diazo condensation pigments, anthraquinone pigments, pyrazolones, perinones, aminoketone pigments, indigo or triphenylmethane pigments.

Overviews of customary inorganic and organic pigments may be found, for example, in K. Leissler and G. Rösch, Kunststoffe 1996, 86, 965 and in *Ullmann's Enyclopädie der technischen Chemie*, 4th Edition, keywords: pigments: introduction; Vol. 18, p. 547 ff., Organische Pigmente, Vol. 18, p. 661 ff; Thieme Verlag Stuttgart, 1977. It is possible to produce concentrates comprising one pigment or mixtures comprising two, three or more diffetent pigments.

Polyethylene wax, which is a wax-like molding composition comprising polyethylene or copolymers of ethylene with from 0 to 20 mol % of one or more comonomers such as propene, 1-butene, 1-pentene, 1-hexene, 1-octene, 1-decene or 1-undecene. Preference is given to polyethylene wax containing from 0 to 10 mol % of propene, 1-butene, 1-pentene or 1-hexene. The mean molar masses $M_W$ of these polyolefin waxes are from 500 to 20,000 g/mol, preferably from 2000 to 10,000 g/mol and particularly preferably from 3000 to 8000 g/mol. The Q values are in the range from 1.5 to 5, preferably from 1.8 to 3.5 and particularly preferably from 2 to 3. The melting points of these waxes are in the range from 80 to 165° C., preferably from 100 to 140° C. and particularly preferably from 105 to 120° C.

If desired, a thermoplastic polymer as carrier polymer; this polymer is, for example, polyethylene, polypropylene, polystyrene, polyoxymethylene, a polystyrene copolymer such as a styrene-butadiene copolymer, an acrylonitrile-butadiene-styrene terpolymer, or polyvinyl chloride or else a copolymer of ethylene with from 0.1 to 20 mol % of 1-butene, 1-pentene, 4-methyl-1-pentene, 1-hexene, 1-octene, 1-decene or 1-undecene.

If desired, from 0 to 10% by weight of additives such as antioxidants; preference is given to antioxidants such as sterically hindered phenols or sterically hindered amines "HALS"; very particular preference is given to sterically hindered phenols of the Irganox® grades from Ciba.

The ratios of the various components can be varied within wide limits. The ratios are matched so that they add up to a total of 100% by weight.

The pigment or pigments are used in minimum amounts of 1% by weight, preferably 5% by weight and particularly preferably 10% by weight. If the proportions are smaller, a satisfactory color strength cannot be achieved. An appropriate upper limit is 60% by weight, in particular 45% by weight, because the pigments are the most expensive constituent of the pigment concentrates.

The wax is used in an amount of at least 1% by weight in pigment concentrates comprising a carrier polymer; preference is given to an amount of at least 2% by weight because satisfactory wetting of pigment and carrier polymer is no longer achieved below this proportion by weight. In pigment concentrates comprising a carrier polymer, the maximum amount of wax used is preferably 30% by weight and particularly preferably 20% by weight, because excessively high amounts of wax in the end product can adversely affect the mechanical properties of the plastic molding or sheet to be colored. In pigment concentrates which are to be produced without use of a carrier polymer, an upper limit of 90% by weight is appropriate. An appropriate minimum wax content in a pigment concentrate which is free of carrier polymer is 40% by weight, since otherwise the concentrate becomes too expensive.

Carrier polymers are added if desired. In cases where a carrier polymer is used, it is used in a proportion of at least 30% by weight, because this facilitates later mixing-in of the pigment concentrate in the production of plastic moldings and plastic sheets. An appropriate upper limit is 80% by weight.

Additives are added only if desired and then in small amounts. An appropriate lower limit for antioxidants such as Irganox® is 0.1% by weight, since significant oxidation protection is no longer possible at an amount less than this; preference is given to 0.5% by weight and particular preference is given to 1% by weight. An appropriate upper limit is 5% by weight, because otherwise the processing properties of the pigment are visibly impaired by the low molecular weight component; preference is given to 2% by weight and particular preference is given to 1.5% by weight. A further class of additives comprises lead salts such as basic lead sulfate or lead stearate or mixtures thereof; these are added in proportions of in each case from 0.5 to 2% by weight, preferably from 1.0 to 1.5% by weight.

Metallocene polyethylene waxes are known per se. They are described, for example, in EP-A 0 321 851 and in EP-B 0 602 509. A process for preparing these metallocene polyolefin waxes is disclosed in EP-B 0 602 509. The metallocene used here is a sandwich compound of the formula Ia–e.

In formula Ia

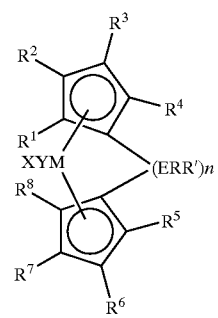

Ia

M is an element selected from the group consisting of Ti, Zr, Hf, V, Nb or Ta in the oxidation state +4; preferably Ti, Zr or Hf and particularly preferably Zr or Hf;

X and Y are, independently of one another, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-penylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy or $NR^{17}R^{18}$, where $R^{17}$ and $R^{18}$ are selected independently from among hydrogen, $C_1$–$C_{12}$-alkyl groups, $C_2$–$C_{12}$-alkenyl groups and $C_6$–$C_{14}$-aryl groups, which may together form a saturated or unsaturated 5- to 10-membered ring; preference is given to the dimethylamino, diethylamino, diisopropylamino, methylphenylamino and diphenylamino groups. Examples of amino groups having saturated rings are the N-piperidyl group and the N-pyrrolidinyl group; examples of amino groups having unsaturated rings are the N-pyrryl group, the N-indolyl group and the N-carbazolyl group;

E is selected from among C, Si, Ge and Sn; preference is given to C and Si;

n is selected from among the numbers 1, 2 or 3; n is preferably 1 or 2 and particularly preferably 1;

R and R' are, independently of one another, hydrogen, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

$C_2$–$C_{12}$-alkenyl, preferably $C_2$- to $\omega$-$C_8$-alkenyl such as vinyl, allyl, but-3-en-1-yl, $\omega$-pentenyl, $\omega$-hexenyl, $\omega$-heptenyl and $\omega$-octenyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

or $C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

where R and R' together with E may form a saturated or unsaturated 4- to 9-membered ring;

$R^1$ to $R^8$ are, independently of one another, hydrogen, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_2$–$C_{12}$-alkenyl, preferably $C_2$- to $\omega$-$C_8$-alkenyl such as vinyl, allyl, but-3-en-1-yl, $\omega$-pentenyl, $\omega$-hexenyl, $\omega$-heptenyl and $\omega$-octenyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

siloxy groups $OSiR^{19}R^{20}R^{21}$, where $R^{19}$ to $R^{21}$ are selected independently from among hydrogen, $C_1$–$C_{12}$-alkyl groups, $C_3$–$C_{12}$-cycloalkyl groups, $C_6$–$C_{14}$-aryl groups, substituted $C_6$–$C_{14}$-aryl groups, $C_1$–$C_{12}$-alkoxy groups and benzyl groups and $C_6$–$C_{14}$ aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryl groups which are in turn substituted by one or more $C_1$–$C_{12}$-alkyl groups, $C_1$–$C_{12}$-alkenyl groups, $C_3$–$C_{12}$-cycloalkyl groups, $C_6$–$C_{14}$-aryl groups, siloxy groups OSi$R^{19}R^{20}R^{21}$ or $C_1$–$C_{12}$-alkoxy groups, with these groups being as specified above;

where two adjacent radicals may together form a saturated or unsaturated 4- to 9-membered ring;

for example, two radicals may together be:

—(CH$_2$)$_3$-(trimethylene), —(CH$_2$)$_4$-(tetramethylene), —(CH$_2$)$_5$-(pentamethylene), —(CH$_2$)$_6$-(hexamethylene), —CH$_2$—CH=CH—, —CH$_2$—CH=CH—CH$_2$—, —CH=CH—CH=CH—, —O—CH$_2$—O—, —O—CH(CH$_3$)—O—, —CH—(C$_6$H$_5$)—O—, —O—CH$_2$—CH$_2$—O—, —O—C(CH$_3$)$_2$—O—, —N(CH$_3$)—CH$_2$—CH$_2$—N(CH$_3$)—, —N(CH$_3$)—CH$_2$—N(CH$_3$)— or —O—Si(CH$_3$)$_2$—O—.

A particular embodiment comprises metallocenes for the formula Ib.

In formula Ib

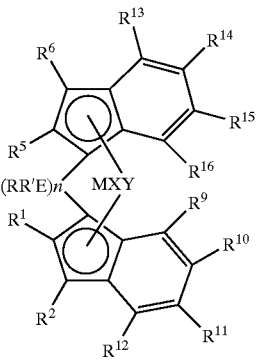

Ib

M is an element selected from the group consisting of Ti, Zr, Hf, V, Nb or Ta in the oxidation state +4; preferably Ti, Zr or Hf and particularly preferably Zr or Hf;

X and Y are, independently of one another, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy, or N$R^{17}R^{18}$, where $R^{17}$ and $R^{18}$ are selected independently from among hydrogen, $C_1$–$C_{12}$-alkyl groups, $C_2$–$C_{12}$-alkenyl groups, benzyl groups and $C_6$–$C_{14}$-aryl groups, which may together form a saturated or unsaturated 5- to 10-membered ring; preference is given to the dimethylamino, diethylamino, diisopropylamino, methylphenylamino and diphenylamino groups. Examples of amino groups having saturated rings are the N-piperidyl group and the N-pyrrolidinyl group; examples of amino groups having unsaturated rings are the N-pyrryl group, the N-indolyl group and the N-carbazolyl group;

E is selected from among C, Si, Ge and Sn; preference is given to C and Si;

n is selected from among the numbers 1, 2 or 3; n is preferably 1 or 2 and particularly preferably 1;

R and R' are, independently of one another, hydrogen, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

$C_2$–$C_{12}$-alkenyl, preferably $C_2$- to $\omega$-$C_8$-alkenyl such as vinyl, allyl, but-3-en-1-yl, $\omega$-pentenyl, $\omega$-hexenyl, $\omega$-heptenyl and $\omega$-octenyl;

$C_3$–$C_{12}$-cycloalkyl, such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

or $C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

where R and R' together with E may form a saturated or unsaturated 4- to 9-membered ring;

$R^1$, $R^2$, $R^5$, $R^6$ and $R^9$ to $R^{16}$ are, independently of one another, hydrogen, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_2$–$C_{12}$-alkenyl, preferably $C_2$- to ω-$C_8$-alkenyl such as vinyl, allyl, but-3-en-1-yl, ω-pentenyl, ω-hexenyl, ω-heptenyl and ω-octenyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

siloxy groups $OSiR^{19}R^{20}R^{21}$, where $R^{19}$ to $R^{21}$ are selected independently from among hydrogen, $C_1$–$C_{12}$-alkyl groups, $C_3$–$C_{12}$-cycloalkyl groups, $C_6$–$C_{14}$-aryl groups, substituted $C_6$–$C_{14}$-aryl groups, $C_1$–$C_{12}$-alkoxy groups and benzyl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryl groups which are in turn substituted by one or more $C_1$–$C_{12}$-alkyl groups, $C_1$–$C_{12}$-alkenyl groups, $C_3$–$C_{12}$-cycloalkyl groups, $C_6$–$C_{14}$-aryl groups, siloxy groups $OSiR^{19}R^{20}R^{21}$ or $C_1$–$C_{12}$-alkoxy groups, with these groups being as specified above;

where two adjacent radicals may together form a saturated or unsaturated 4- to 9-membered ring;

for example, two radicals may together be:

—(CH$_2$)$_3$-(trimethylene), —(CH$_2$)$_4$-(tetramethylene), —(CH$_2$)$_5$-(pentamethylene), —(CH$_2$)$_6$-(hexamethylene), —CH$_2$—CH=CH—, —CH$_2$—CH=CH—CH$_2$—, —CH=CH—CH=CH—, —O—CH$_2$—O—, —O—CH(CH$_3$)—O—, —CH—(C$_6$H$_5$)—O—, —O—CH$_2$—CH$_2$—O—, —O—C(CH$_3$)$_2$—O—, —N(CH$_3$)—CH$_2$—CH$_2$—N(CH$_3$)—, —N(CH$_3$)—CH$_2$—N(CH$_3$)— or —O—Si(CH$_3$)$_2$—O.

In formula Ic

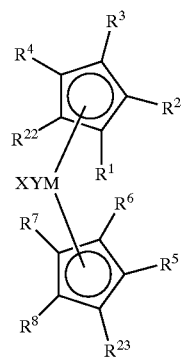

M is an element selected from the group consisting of Ti, Zr, Hf, V, Nb or Ta in the oxidation state +4; preferably Ti, Zr or Hf and particularly preferably Zr or Hf;

X and Y are, independently of one another, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy, or $NR^{17}R^{18}$, where $R^{17}$ and $R^{18}$ are selected independently from among hydrogen, $C_1$–$C_{12}$-alkyl groups, $C_2$–$C_{12}$-alkenyl groups and $C_6$–$C_{14}$-aryl groups, which may together form a saturated or unsaturated 5- to 10-membered ring; preference is given to the dimethylamino, diethylamino, diisopropylamino, methylphenylamino and diphenylamino groups. Examples of amino groups having saturated rings are the N-piperidyl group and the N-pyrrolidinyl group; examples of amino groups having unsaturated rings are the N-pyrryl group, the N-indolyl group and the N-carbazolyl group;

$R^1$ to $R^8$ and $R^{22}$ and $R^{23}$ are, independently of one another, hydrogen, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_2$–$C_{12}$-alkenyl, preferably $C_2$- to $\omega$-$C_8$-alkenyl such as vinyl, allyl, but-3-en-1-yl, $\omega$-pentenyl, $\omega$-hexenyl, $\omega$-heptenyl and $\omega$-octenyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

siloxy groups $OSiR^{19}R^{20}R^{21}$, where $R^{19}$ to $R^{21}$ are selected independently from among hydrogen, $C_1$–$C_{12}$-alkyl groups, $C_2$–$C_{12}$-alkenyl groups, $C_3$–$C_{12}$-cycloalkyl groups, $C_6$–$C_{14}$-aryl groups, substituted $C_6$–$C_{14}$-aryl groups, $C_1$–$C_{12}$-alkoxy groups and benzyl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryl groups which are in turn substituted by one or more $C_1$–$C_{12}$-alkyl groups, $C_1$–$C_{12}$-alkenyl groups, $C_3$–$C_{12}$-cycloalkyl groups, $C_6$–$C_{14}$-aryl groups, siloxy groups $OSiR^{11}R^{12}R^{13}$ or $C_1$–$C_{12}$-alkoxy groups, with these groups being as specified above;

where two adjacent radicals may together form a saturated or unsaturated 4- to 9-membered ring. For example, two radicals may together be:

—$(CH_2)_3$-(trimethylene), —$(CH_2)_4$-(tetramethylene), —$(CH_2)_5$-(pentamethylene), —$(CH_2)_6$-(hexamethylene), —$CH_2$—$CH$=$CH$—, —$CH_2$—$CH$=$CH$—$CH_2$—, —$CH$=$CH$—$CH$=$CH$—, —O—$CH_2$—O—, —O—CH ($CH_3$) —O—, —CH—($C_6H_5$)—O—, —O—$CH_2$—$CH_2$—O—, —O—C ($CH_3$)$_2$—O—, —N($CH_3$)—$CH_2$—$CH_2$—N($CH_3$)—, —N($CH_3$)—$CH_2$—N($CH_3$)— or —O—Si($CH_3$)$_2$—O—.

A preferred embodiment comprises metallocenes of the formula Id. In formula Id

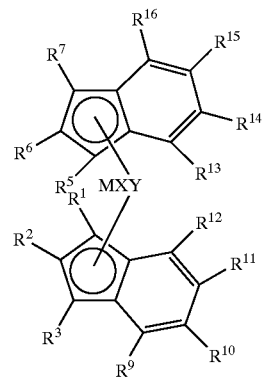

Id

M is an element selected from the group consisting of Ti, Zr, Hf, V, Nb or Ta in the oxidation state +4; preferably Ti, Zr or Hf and particularly preferably Zr or Hf;

X and Y are, independently of one another, halogen such as fluorine, chlorine, bromine or iodine, preferably chlorine or bromine;

- $C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;
- $C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;
- $C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;
- $C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;
- $C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy or
- $NR^{17}R^{18}$, where $R^{17}$ and $R^{18}$ are selected independently from among hydrogen, $C_1$–$C_{12}$-alkyl groups, benzyl groups and $C_6$–$C_{14}$-aryl groups, which may together form a saturated or unsaturated 5–10-membered ring; preference is given to the dimethylamino, diethylamino, diisopropylamino, methylphenylamino and diphenylamino groups. Examples of amino groups having saturated rings are the N-piperidyl group and the N-pyrrolidinyl group; examples of amino groups having unsaturated rings are the N-pyrryl group, the N-indolyl group and the N-carbazolyl group;

$R^1$ to $R^3$, $R^5$ to $R^7$ and $R^9$ to $R^{16}$ are, independently of one another, hydrogen,

- halogen such as fluorine, chlorine, bromine or iodine, preferably chlorine or bromine;
- $C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;
- monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;
- $C_2$–$C_{12}$-alkenyl, preferably $C_2$- to $\omega$-$C_8$-alkenyl such as vinyl, allyl, but-3-en-1-yl, $\omega$-pentenyl, $\omega$-hexenyl, $\omega$-heptenyl and $\omega$-octenyl;
- $C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;
- $C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;
- $C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;
- siloxy groups $OSiR^{19}R^{20}R^{21}$, where $R^{19}$ to $R^{21}$ are selected independently from among hydrogen, $C_1$–$C_{12}$-alkyl groups, $C_2$–$C_{12}$-alkenyl, $C_3$–$C_{12}$-cycloalkyl, $C_6$–$C_{14}$-aryl, substituted $C_6$–$C_{14}$-aryl, $C_1$–$C_{12}$-alkoxy groups and benzyl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;
- $C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;
- $C_6$–$C_{14}$-aryl groups which are in turn substituted by one or more $C_1$–$C_{12}$-alkyl groups, $C_1$–$C_{12}$-alkenyl groups, $C_3$–$C_{12}$-cycloalkyl groups, $C_6$–$C_{14}$-aryl groups, siloxy groups $OSiR^{19}R^{20}R^{21}$ or $C_1$–$C_{12}$-alkoxy groups, with these groups being as specified above;
- where two adjacent radicals may together form a saturated or unsaturated 4- to 9-membered ring. For example, two radicals may together be:
—$(CH_2)_3$-(trimethylene), —$(CH_2)_4$-(tetramethylene), —$(CH_2)_5$-(pentamethylene), —$(CH_2)_6$-(hexamethylene), —$CH_2$—$CH$=$CH$—, —$CH_2$—$CH$=$CH$—$CH_2$—, —$CH$=$CH$—$CH$=$CH$—, —O—$CH_2$—O—, —O—$CH(CH_3)$—O—, —$CH$—$(C_6H_5)$—O—, —O—$CH_2$—$CH_2$—O—, —O—$C(CH_3)_2$—O—, —$N(CH_3)$—$CH_2$—$CH_2$—$N(CH_3)$—, —$N(CH_3)$—$CH_2$—$N(CH_3)$— or —O—$Si(CH_3)_2$—O—.

In formula Ie

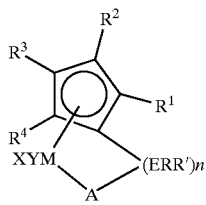

Ie

M is an element selected from the group consisting of Ti, Zr, Hf, V, Nb or Ta in the oxidation state +4; preferably Ti, Zr or Hf and particularly preferably Zr or Hf;

X and Y are, independently of one another, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy, or $NR^{17}R^{18}$, where $R^{17}$ and $R^{18}$ are selected independently from among hydrogen, $C_1$–$C_6$-alkyl groups and $C_6$–$C_{14}$-aryl groups, which may together form a saturated or unsaturated 5–10-membered ring; preference is given to the dimethylamino, diethylamino, diisopropylamino, methylphenylamino and diphenylamino groups. Examples of amino groups having saturated rings are the N-piperidyl group and the N-pyrrolidinyl group; examples of amino groups having unsaturated rings are the N-pyrryl group, the N-indolyl group and the N-carbazolyl group;

E is selected from among C, Si, Ge or Sn; preference is given to C and Si;

n is selected from among the numbers 1, 2 or 3; n is preferably 1 or 2 and particularly preferably 1;

R and R' are, independently of one another, hydrogen, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

$C_2$–$C_{12}$-alkenyl, preferably $C_2$- to $\omega$-$C_8$-alkenyl such as vinyl, allyl, but-3-en-1-yl, $\omega$-pentenyl, $\omega$-hexenyl, $\omega$-heptenyl and $\omega$-octenyl;

$C_3$–$C_{12}$-cycloalkyl, such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

or $C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy where R and R' may together form a saturated or unsaturated 4- to 9-membered ring;

$R^1$ to $R^4$ are, independently of one another, hydrogen, halogen such as fluorine, chlorine, bromine or iodine, preferably chlorine or bromine;

$C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_2$–$C_{12}$-alkenyl, preferably $C_2$- to $\omega$-$C_8$-alkenyl such as vinyl, allyl, but-3-en-1-yl, $\omega$-pentenyl, $\omega$-hexenyl, $\omega$-heptenyl and $\omega$-octenyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

siloxy groups $OSiR^{19}R^{20}R^{21}$, where $R^{19}$ to $R^{21}$ are selected independently from among hydrogen, $C_1$–$C_{12}$-alkyl groups, $C_2$–$C_{12}$-alkenyl, $C_3$–$C_{12}$-cycloalkyl, $C_6$–$C_{14}$-aryl, substituted $C_6$–$C_{14}$-aryl, $C_1$–$C_{12}$-alkoxy groups and benzyl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

$C_1$–$C_{12}$-alkoxy groups, preferably $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryl groups which are in turn substituted by one or more $C_1$–$C_{12}$-alkyl groups, $C_1$–$C_{12}$-alkenyl groups, $C_3$–$C_{12}$-cycloalkyl groups, $C_6$–$C_{14}$-aryl groups, siloxy groups $OSiR^8R^9R^{10}$ or $C_1$–$C_{12}$-alkoxy groups, with these groups being as specified above;

where two adjacent radicals may together form a saturated or unsaturated 4- to 9-membered ring, preferably 5- to 8-membered. For example, two radicals may together be:

—($CH_2$)$_3$-(trimethylene), —($CH_2$)$_4$-(tetramethylene), —($CH_2$)$_5$-(pentamethylene), —($CH_2$)$_6$-(hexamethylene), —$CH_2$—$CH$=$CH$—, —$CH_2$—$CH$=$CH$—$CH_2$—, —$CH$=$CH$—$CH$=$CH$—, —O—$CH_2$—O—, —O—$CH(CH_3)$—O—, —$CH$—($C_6H_5$)—O—, —O—$CH_2$—$CH_2$—O—, —O—C($CH_3$)$_2$—O—, —N($CH_3$)—$CH_2$—$CH_2$—N($CH_3$)—, —N($CH_3$)—$CH_2$—N($CH_3$)— or —O—$Si(CH_3)_2$—O—;

A is oxygen, sulfur, N—$R^{24}$ or P—$R^{24}$, where $R^{24}$ is selected from among halogen, $C_1$–$C_{12}$-alkyl, $C_3$–$C_{12}$-cycloalkyl, substituted or unsubstituted $C_6$–$C_{14}$-aryl groups and $C_1$–$C_{12}$-alkoxy groups, with these groups being defined as described under $R_1$.

Illustrative, very particularly preferred examples of metallocenes of the formulae Ia–e are:

rac-ethylenebis[indenyl]zirconium dichloride, rac-ethylenebis[4,5,6,7-tetrahydroindenyl]zirconium dichloride, rac-dimethylsilylbis[2-methylindenyl]zirconium dichloride, rac-tetramethylenesilylbis[2-methylindenyl]zirconium dichloride, rac-dimethylsilylbis[2-methylbenzo[4,5]indenyl]zirconium dichloride, rac-dimethylsilylbis[2-methyl-4-tert-butylcyclopentadienyl]zirconium dichloride, rac-dimethylsilylbis[2,3,5-trimethylcyclopentadienyl]zirconium dichloride, rac-dimethylsilylbis[2-methyl-4-phenylindenyl]zirconium dichloride, 2,2-isopropylidenecyclopentadienyl-9-fluorenylzirconium dichloride, diphenylmethyl-cyclopentadienyl-9-fluorenylzirconium dichloride;

bis(n-butylcyclopentadienyl)zirconium dichloride, bis[2-methyl-4-tert-butylcyclopentadienyl]zirconium dichloride, bis[2,3,5-trimethylcyclopentadienyl] zirconium dichloride, bis[indenyl]zirconium dichloride, bis[2-methylindenyl]zirconium dichloride, bis[2-methylbenzo[4,5]indenyl]zirconium dichloride, bis[4,5,6,7-tetrahydroindenyl]zirconium dichloride, bis [2-methyl-4-phenylindenyl]zirconium dichloride;

dimethylsilyl-tert-butylamidotetramethylcyclopentadienyltitanium dichloride, dimethylsilylisopropylamidotetramethylcyclopentadienyltitanium dichloride, 2,3,5-trimethylsilyl-tert-butylamidotetramethylcyclopentadienyltitanium dichloride, dimethylsilylphenylamidotetramethylcyclopentadienyltitanium dichloride, dimethylsilyloxytetramethylcyclopentadienyltitanium dichloride, 2,3,5-trimethylsilyloxytetramethylcyclopentadienyltitanium dichloride and also the corresponding dibromides and dimethyl compounds.

For metallocenes to be catalytically active, they have to be activated by means of a compound capable of forming metallocenium ions. Suitable compounds capable of forming metallocenium ions are selected boron compounds having electron-withdrawing radicals (e.g. trispentafluorophenylborane, N,N-dimethylanilinium tetrakispentafluorophenylborate, tri-n-butylammonium tetrakispentafluorophenylborate, N,N-dimethylanilinium tetrakis(3,5-bisperfluoromethyl)phenylborate, tri-n-butylammonium tetrakis(3,5-bisperfluoromethyl) phenylborate and tritylium tetrakispentafluorophenylborate). These activators are disclosed in EP-A 0 468 537 and EP-A 0 426 638. Preference is given to dimethylanilinium tetrakispentafluorophenylborate, tritylium tetrakispentafluorophenylborate and trispentafluorophenylborane.

Another suitable class of compounds capable of forming metallocenium ions is formed by the aluminoxanes of the formulae IIa–b (e.g. DE-A 30 07 725).

The structure of the aluminoxanes is not known precisely. They are products which are obtained by careful partial hydrolysis of aluminum alkyls (cf. DE-A 30 07 725). These products are not in pure form, but rather as mixtures of open-chain and cyclic structures of the types IIa and b. The compounds in these mixtures are presumably in dynamic equilibrium with one another.

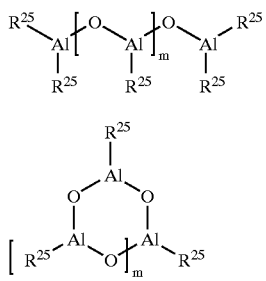

In formula IIa, the radicals $R^{25}$ are identical or different and are, independently of one another,

- $C_1$–$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably methyl;
- $C_3$–$C_{12}$cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;
- $C_7$–$C_{20}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl, or
- $C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl; and
- m is an integer from 0 to 40, preferably from 0 to 25 and particularly preferably from 0 to 22.

Cage-like structures are also discussed in the literature for aluminoxanes (Y. Koide, S. G. Bott, A. R. Barron *Organometallics* 1996, 15, 2213–26; A. R. Barron *Macromol. Symp.* 1995, 97, 15–25). Regardless of the actual structure of the aluminoxanes, they are suitable as activators for metallocenes.

Metallocene and compound capable of forming metallocenium ions together form a catalyst system. The activity of this catalyst system can be increased further by addition of a further aluminum alkyl compound of the formula $Al(R^{25})_3$.

The addition of further aluminum alkyl not only increases the activity of the catalyst system, but the aluminum alkyl also acts as a molar mass regulator. A further effective molar mass regulator is hydrogen. In addition, the molar mass can be regulated in a targeted manner by means of the reaction temperature and the residence time.

Modern industrial-scale production processes for polyolefin waxes are solution processes, suspension processes, bulk polymerization processes in the liquid or supercritical monomer and also gas-phase processes. The latter can be stirred gas phases or gas-phase fluidized-bed processes.

For metallocenes to be able to be used in suspension processes, bulk polymerization processes or gas-phase processes, it is advantageous to immobilize them on a solid support. Otherwise, morphology problems with the polymer (lumps, wall deposits, blockages in lines or heat exchangers) can occur and force shutdown of the plant.

The catalyst system comprising metallocene and activator can be readily deposited on a solid support. Suitable support materials are, for example, porous metal oxides of metals of groups 2–14 or mixtures thereof, also sheet silicates and solid halides of metals of groups 1, 2 and 13. Preferred examples of metal oxides of groups 2–14 are $SiO_2$, $B_2O_3$, $Al_2O_3$, MgO, CaO and ZnO. Preferred sheet silicates are montmorillonites and bentonites; preferred halides are $MgCl_2$ and amorphous $AlF_3$.

Particularly preferred support materials are spherical silica gels and aluminosilicate gels of the formula $SiO_2$.a $Al_2O_3$, where a is generally in the range from 0 to 2, preferably from 0 to 0.5. Such silica gels are commercially available, e.g. Silica Gel 332 or S 2101 from W. R. Grace.

Particle sizes of the support material which had been found to be useful are mean particle diameters of 1–300 μm, preferably from 20 to 80 μm, determined by known methods such as sieving. The pore volume of these supports is from 1.0 to 3.0 ml/g, preferably from 1.6 to 2.2 ml/g and particularly preferably from 1.7 to 1.9 ml/g. The BET surface area is from 200 to 750 $m^2$/g, preferably from 250 to 400 $m^2$/g.

In order to remove impurities, in particular moisture, adhering to the support material, the support materials can be baked out before doping; suitable temperatures for this are from 45 to 1000° C. Temperatures of from 100 to 750° C. are particularly suitable for silica gels and other metal oxides; for $MgCl_2$ supports, the temperature range from 50 to 100° C. is preferred. This baking-out should be carried out over a period of from 0.5 to 24 hours, preferably from 1 to 12 hours. The pressure conditions are not critical per se; baking-out can be carried out under atmospheric pressure. However, reduced pressures of from 0.1 to 500 mbar are advantageous; a range from 1 to 100 mbar is particularly advantageous and a range from 2 to 20 mbar is very particularly advantageous. Chemical pretreatment of the support material is also possible.

The procedure for doping the catalyst is generally to slurry the support material in a suspension medium and to combine this suspension with the solution of the metallocene/activator system. Here, the volume of the suspension medium is from 1 to 20 times the pore volume of the catalyst support. The catalyst can subsequently be separated from the suspension medium by a suitable method such as filtration, centrifugation or evaporation.

The polyolefin waxes obtained by one of the abovementioned polymerization processes with the aid of one of the abovementioned metallocene catalysts can be processed to give masterbatches by various methods. In all these methods, wax and carrier polymer are melted without the pigment in a decisive step, and the pigment or pigments and, if desired, additives, are then incorporated.

Before actual mixing, the components can be premixed if desired, for which drum or tumbler mixers are particularly useful. Micronization can also be carried out if desired.

In the actual mixing process, a differentiation is made between batchwise and continuos methods. For batchwise processes, it is possible to use simple kneaders; continuous processes can be carried out, for example, in rapid mixers, single-screw extruders, twin-screw extruders, Buss kneaders, planetary roll extruders, open double-trough kneaders or rapid stirrers.

The pigment concentrations are subsequently granulated in a customary way. This can be carried out using extrudate granulators in which the mixture is cooled under water as a continuous strand and is then chopped into pellets or granules either in or after leaving the water bath. Perforated plates are also suitable as cutters ("hot-cut pelletization").

To produce the moldings and sheets, a mixture of
from 0.01 to 10% by weight of pigment concentrate, preferably from 0.5 to 5% by weight of pigment concentrate and particularly preferably from 0.5 to 2.5% by weight of pigment concentrate, with
from 90 to 99.99% by weight of polymer, preferably from 95 to 99.5% by weight and particularly preferably from 97.5 to 98.5% by weight of polymer and, if desired,
from 0 to 5% by weight of additives, preferably antioxidants or biocides, is prepared first.

Suitable polymer are: polyethylene, polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, polyamides such as nylon 6 or nylon 6.6, polyvinyl chloride and copolymers of ethylene with 0.1–20 mol % of 1-butene, 1-pentene, 1-hexene, 4-methyl-1-pentene, 1-octene, 1-decene or 1-undecene. The polymer to be colored and the carrier polymer of the masterbatch can be the same, but do not have to be.

To mix the pigment concentrates with the polymers and, if desired, the additives, it is in principle possible to use the same methods as for preparing the masterbatch itself. For batchwise processes, it is again possible to use simple kneaders; continuous processes can be carried out, for example, in rapid mixers, single-screw extruders, twin-screw extruders, Buss kneaders, planetary roll extruders, open double-trough kneaders or rapid stirrers. Continuous processes are preferred.

The moldings and sheets can be produced by injection molding, film extrusion or casting at temperatures above the melting point of the polymer. The processing properties of the moldings and sheets of the present invention are not adversely affected by the use of the pigment concentrates of the present invention.

The moldings and sheets obtained by the process of the present invention differ from the moldings and sheets which are commercially available in that they have a distinctly greater brilliance of color. The mechanical properties of the materials are not adversely affected by use of the pigment concentrates of the present invention.

WORKING EXAMPLE

The metallocene catalyst used was bis(n-butylcyclopentadienyl)zirconium dichloride supported on silica gel and activated using MAO. The method of preparing the metallocene catalyst is described in EP-B 0 571 882, Example 5, with the following modifications having been made to the recipe:

| Material | Catalyst used | Catalyst of EP 0 571 882 |
|---|---|---|
| Metallocene | $(n\text{-}C_4H_9\text{—}C_5H_4)_2ZrCl_2$ | $Cp_2ZrCl_2$ |
| Silica gel | S2101 | Aerosil ® R 812 |
| Suspension medium | n-Heptane | Diesel oil |

The metallocene polyethylene wax was prepared in an apparatus as described in EP-B 0 602 509, Example 1 or drawing on page 19. The polymerization was carried out in the absence of hydrogen at 60° C., using isobutane instead of propane as suspension medium.

The wax obtained in this way had the following properties: solidification point: 128° C., $M_W$: 4900 g/mol, $M_n$: 2200 g/mol.

As components for the novel pigment concentrate in working Example 1, the following components were used:
25% by weight of Heliogen® Blau (commercially available from BASF AG)
15% by weight of polyethylene wax,
60% by weight of polyethylene (Lupolen® 1800 S) as granules (commercially available from Elenac GmbH).

In working Example 2, which was processed analogously, the following components were used:
25% by weight of Heliogen® Grün (commercially available from BASF AG)
15% by weight of polyethylene wax,
60% by weight of polyethylene (Lupolen® 1800 S) as granules (commercially available from Elenac GmbH).

The components were premixed in a rapid stirrer and heated to the melting point of the wax. This caused the wax to wet the pigment and made it dust free and contributed to dispersion of the pigment in the wax phase. The mixture was subsequently introduced into a twin-screw extruder. The temperature was increased by a further 10° C. During this processing step, the PE granules were enveloped in a thin wax layer. After extrusion, the pigment concentrate was cooled so carefully that the solidified pigment/wax layers were not detached from one another.

The comparative products were produced analogously. Commercially available samples were used as waxes.

To test the color intensity, 1 g of pigment concentrate from the examples indicated was in each case premixed with 91.5 g of Lupolen 50D and 7.5 g of $TiO_2$ as optical brightener, mixed in a blow-molding machine at from 130 to 150° C. and blow-molded to produce canisters.

To assess the color intensity, a 5×5 cm piece was cut from the canisters and examined spectrophotometrically in the wavelength range 400–700 nm (Spectraflash 600 instrument from Datacolor) in accordance with DIN 6176.

The results are shown in Table 1.

TABLE 1

Color intensity assessments of Examples 1–2 and Comparative Examples 1a/b and 2a/b

| Example Number | Polyethylene wax (Process of preparation) | Pigment | Color intensity assessment |
|---|---|---|---|
| | | Phthalocyanine | |
| 1 | Metallocene | Heliogen ® Blau K 6911 D | 100% |
| C 1a | High-pressure | Heliogen Blau K 6911 D | 87.7% |
| C 1b | Ziegler-Natta | Heliogen Blau K 6911 D | 91.9% |
| 2 | Metallocene | Heliogen Grün K 8730 | 100% |
| C 2a | High-pressure | Heliogen Grün K 8730 | 84.8% |
| C 2b | Ziegler-Natta | Heliogen Grün K 8730 | 93.2% |

We claim:

1. A pigment concentrate comprising at least one pigment, a polyethylene wax, optionally a thermoplastic polymer and optionally additives, wherein the polyethylene wax is obtained by (co)polymerizing ethylene and from 0 to 20 mol % of one or more comonomers selected from the group consisting of propene, 1-butene, 1-pentene, 1-hexene, 1-octene, 1-decene and 1-undecene in the presence of a metallocene catalyst.

2. A pigment concentrate as claimed in claim 1 wherein the metallocene catalyst contains Ti, Zr or Hf as central atom.

3. A pigment concentrate as claimed in claim 1 comprising at least one pigment, a polyethylene wax, a thermoplastic polymer and additives.

4. A pigment concentrate as claimed in claim 1 comprising at least one pigment, a polyethylene wax and additives.

5. A process for producing a pigment concentrate as claimed in claim 4, which comprises mixing the components at a temperature above the melting point of the wax.

6. A process for producing a pigment concentrate as claimed in claim 1, which comprises mixing the components at a temperature above the melting point of wax and, where present, the thermoplastic polymer.

7. A plastic molding or a plastic sheet colored by means of a pigment concentrate as claimed in claim 1.

8. A process for coloring a molding or sheet as claimed in claim 7 by means of a pigment concentrate, which comprises mixing the components by homogenization in the melt.

* * * * *